US007600676B1

(12) United States Patent
Rados et al.

(10) Patent No.: US 7,600,676 B1
(45) Date of Patent: Oct. 13, 2009

(54) TWO FACTOR AUTHENTICATIONS FOR FINANCIAL TRANSACTIONS

(75) Inventors: Steven Roy Rados, Danville, CA (US);
Renato Delatorre, Jersey City, NJ (US);
David Murray, Fanwood, NJ (US); Jess Germansky, Rockaway, NJ (US);
Steven Werden, Bridgewater, NJ (US);
Hasan Dossal, Washington, DC (US)

(73) Assignee: Cellco Partnership, Basking Ridge, NJ (US)

( * ) Notice: Subject to any disclaimer, the term of this patent is extended or adjusted under 35 U.S.C. 154(b) by 111 days.

(21) Appl. No.: 11/644,947

(22) Filed: Dec. 26, 2006

(51) Int. Cl.
*G06K 5/00* (2006.01)
*G06Q 40/00* (2006.01)
(52) U.S. Cl. ............... 235/380; 705/44; 705/75; 235/382
(58) Field of Classification Search ........... 235/380, 235/383, 382, 379, 382.5, 377; 705/44, 64, 705/75; 455/406, 410, 407
See application file for complete search history.

(56) References Cited

U.S. PATENT DOCUMENTS

| 5,991,750 | A | * | 11/1999 | Watson ................. 705/44 |
| 6,529,725 | B1 | | 3/2003 | Joao et al. |
| 7,020,773 | B1 | | 3/2006 | Otway et al. |
| 7,089,214 | B2 | | 8/2006 | Wang |
| 7,133,662 | B2 | | 11/2006 | Bravo et al. |
| 7,357,310 | B2 | | 4/2008 | Calabrese et al. |
| 7,447,494 | B2 | * | 11/2008 | Law et al. ............... 455/410 |
| 2002/0066042 | A1 | | 5/2002 | Matsumoto et al. |
| 2002/0082995 | A1 | * | 6/2002 | Christie, IV ............ 705/44 |
| 2007/0143230 | A1 | * | 6/2007 | Narainsamy et al. ...... 705/75 |

* cited by examiner

*Primary Examiner*—Thien M. Le
*Assistant Examiner*—Sonji Johnson
(74) *Attorney, Agent, or Firm*—McDermott Will & Emery LLP

(57) ABSTRACT

The present invention relates to a method for authenticating financial transactions by using an additional factor which is not present on a physical card, and which is not used in sequential transactions. In one example, a purchaser provides card information to a merchant; the merchant transmits the card information and transaction information to an issuer; the issuer authenticates the card information, and transmits verification indicia to a target address associated with the card information. The purchaser target address may be the telephone number of a mobile telephone of the purchaser or a third party (e.g. parent). The purchaser or third party provides the verification indicia to a merchant; and the merchant transmits the verification indicia back to the issuer. The issuer authenticates that the received verification indicia relative to that sent to the target address, and thus the purchaser is the genuine or authentic person authorized to use card information; and the issuer approves the transaction.

13 Claims, 5 Drawing Sheets

FINANCIAL TRANSACTION COMMUNICATIONS

VERIFICATION INDICIA TRANSMITTED THROUGH A MERCHANT

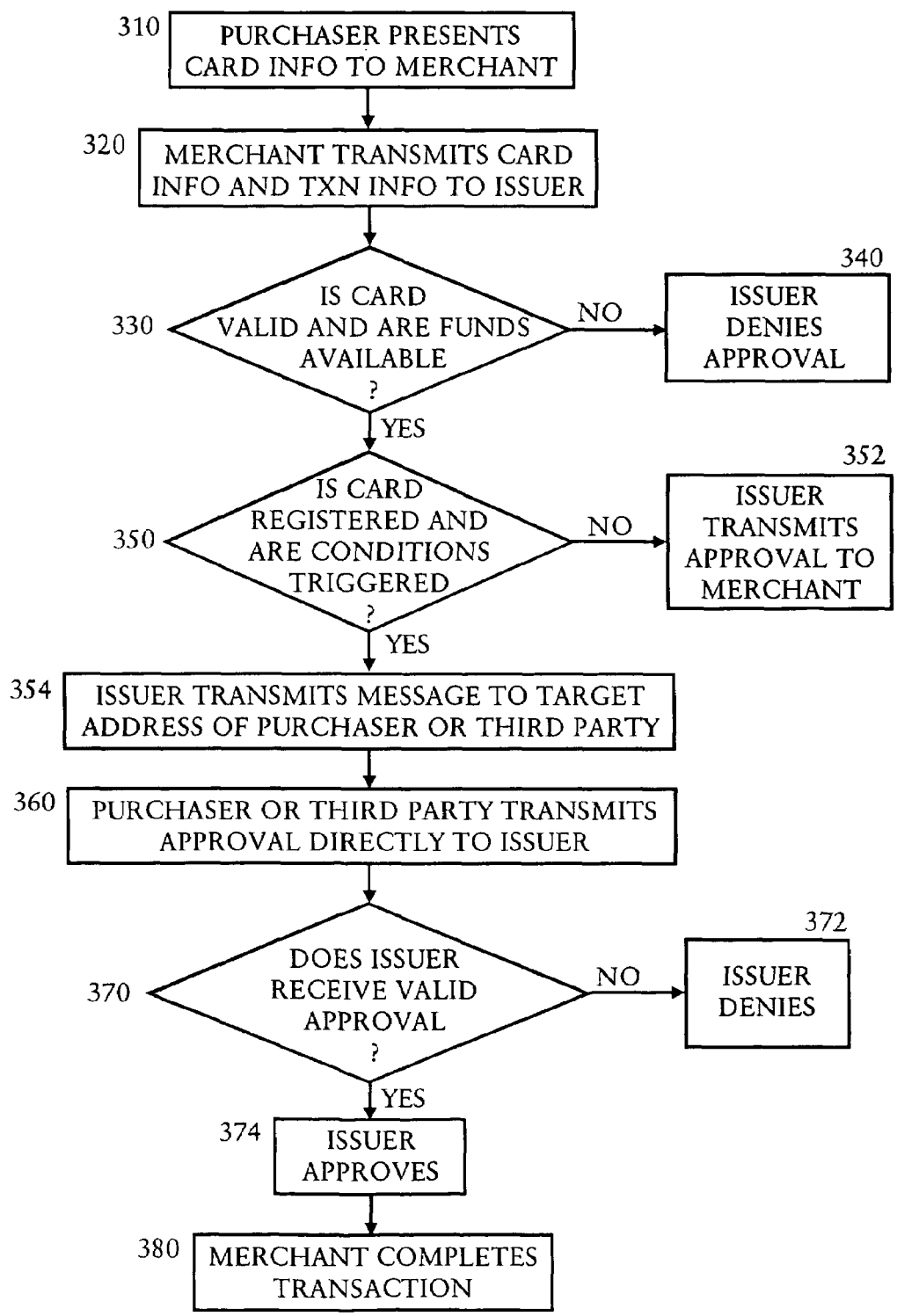

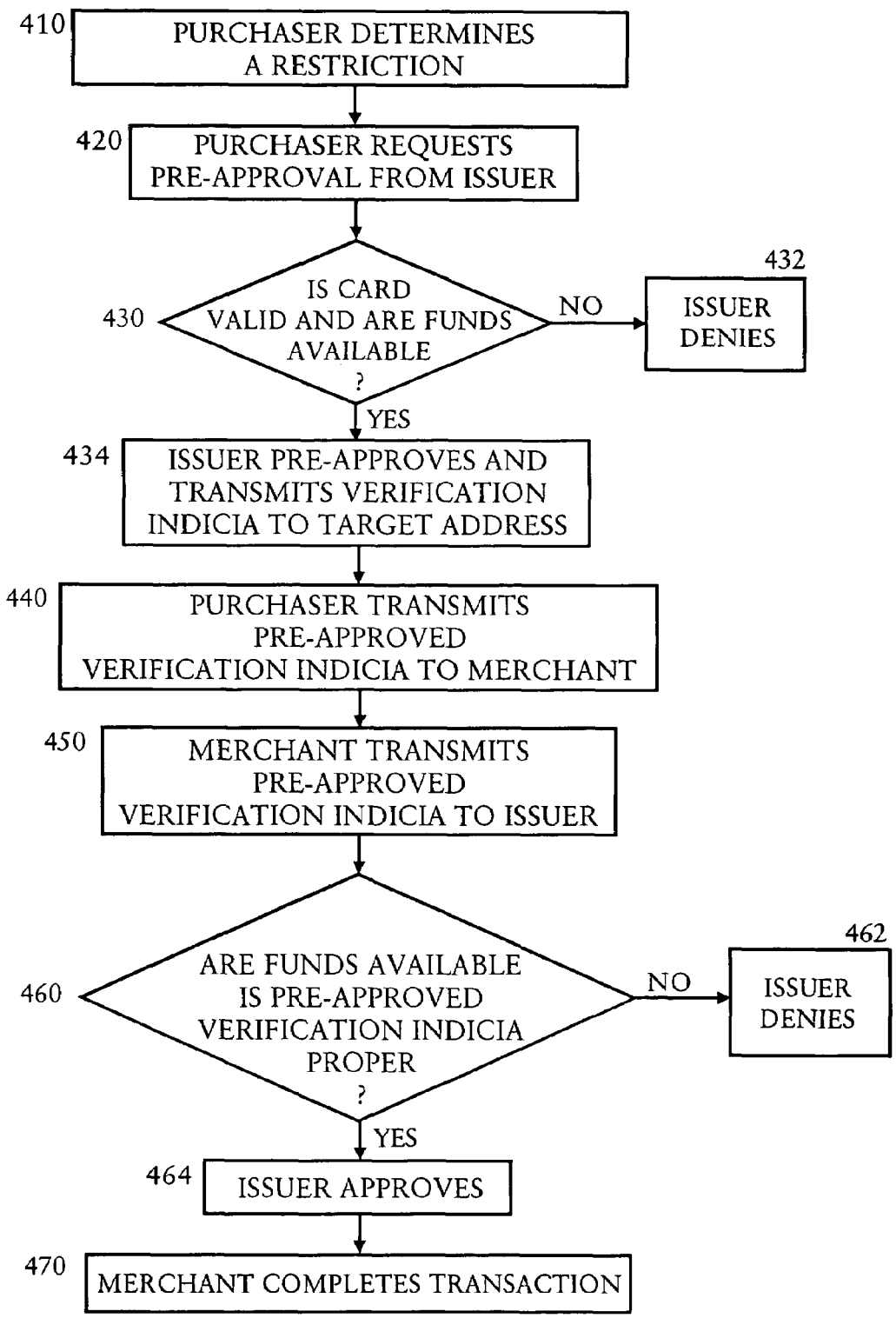

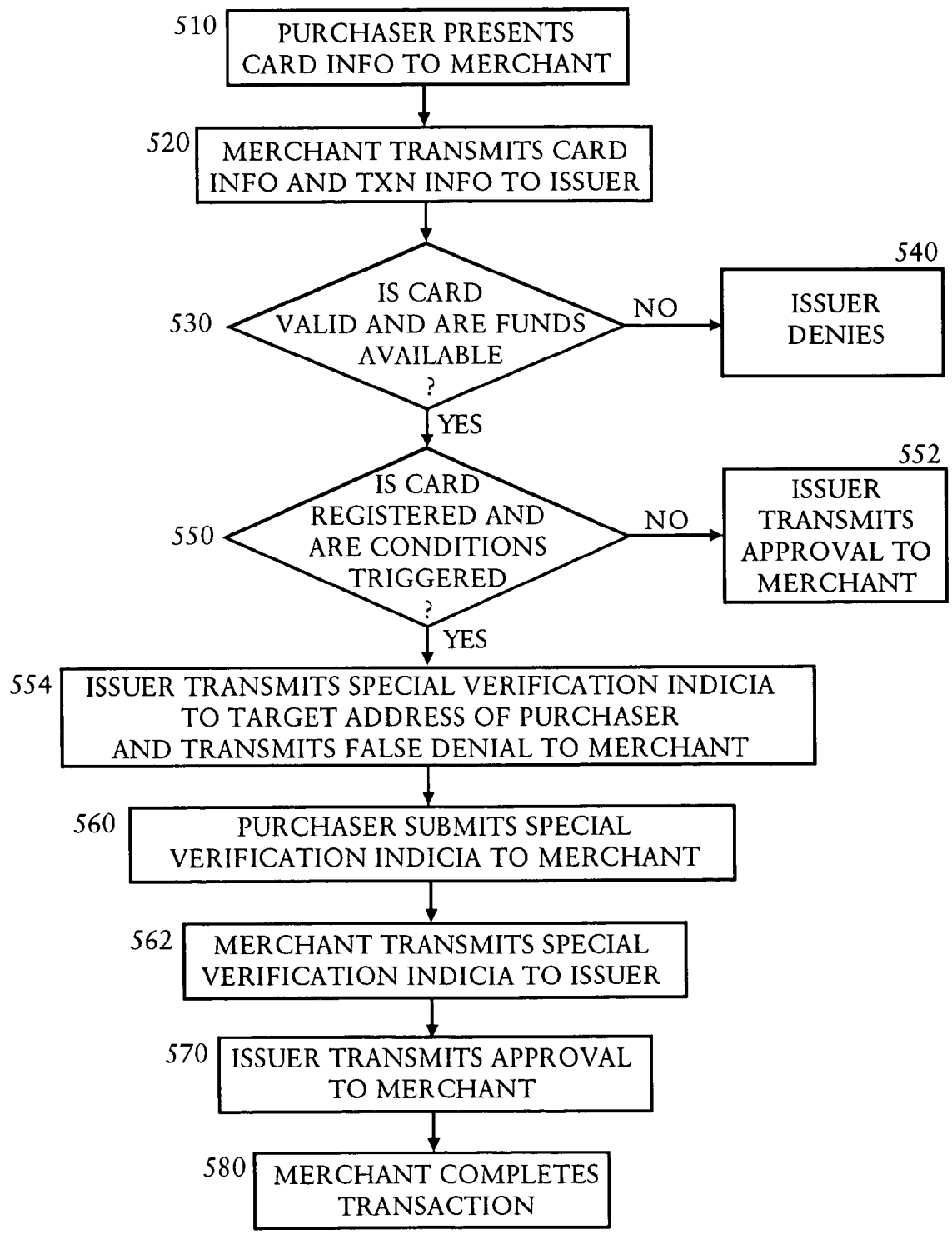

TWO FACTOR AUTHENTICATIONS FOR FINANCIAL TRANSACTIONS

TECHNICAL FIELD

The present subject matter relates to techniques and equipment for data processing, and in particular to authenticate financial transactions using at least two factors.

BACKGROUND

In recent years, there has been a strong decline in the use of tangible currency such as dollar bills and coins. For example, recent increases in gasoline prices have apparently driven a change in consumer financial habits, and most drivers now use convenient financial instruments such as credit cards to purchase gasoline.

Unfortunately, credit cards and similar financial instruments are often targets for various types of criminal attack and fraud. For example, in the crudest form, a criminal may physically steal a credit card and physically use the credit card to make purchases at a merchant's physical store. Some purchases with a credit card, such as automated purchases at a gas pump, may not even require a signature from the criminal. Further, even when a signature is required, a cashier generally does not carefully compare the authorized signature on the back of the credit card against the forged signature from the criminal. On rare occasions, a cashier may request a second form of identification, such as a driver's license, from the criminal.

In a more refined form, a criminal may steal information associated with the credit card, but not steal the physical card itself. The criminal may use this information to generate a duplicate physical card, and then use the duplicate physical card to make purchases.

Alternatively, the criminal may use the stolen information directly, without generating a duplicate physical card. For example, the criminal may use the PAN (Personal Account Number) from the front of the credit card, plus the three digit verification number from the back of the credit card to make a purchase over the Internet.

In industry terminology, the PAN may be a first authentication factor, which is used to authenticate that the purchaser is a registered or authorized user of the credit card. In the above examples, either the authorized signature or the three digit verification number is used as a second authentication factor to provide an additional layer of security.

However, the authorized signature is visibly displayed on the back of most credit cards, and thus is relatively easy to forge when the card is physically stolen. Similarly, the three digit verification number is visibly displayed on the back of most credit cards, and is readily available when the card is physically stolen.

Alternatively, other techniques may be used to obtain the second authentication factor without physically stealing the card. For example, a criminal waiter may use a camera to quickly photograph both sides of a credit card before returning the credit card to the registered or authorized user of the credit card. Stealing information during temporary possession of the card will not immediately alert the registered or authorized user of the card that a theft has occurred, because the physical card is promptly returned.

Other criminal schemes are more sophisticated, and may not require even temporary possession of the physical card. Information on or in the card is the true target of the criminal attack, and obtaining permanent or temporary possession of the physical card itself is merely the most obvious method of obtaining the information.

Other similar financial instruments, such as debit cards, are similarly subject to criminal attack. Debit cards typically have a PIN (Personal Identification Number) which is associated with the card. The PIN is not visible on the debit card, but typically is magnetically encoded on the debit card. Thus, a criminal with physical possession of the card may magnetically read the PIN. Further, a criminal may electronically eavesdrop on the communications network carrying a financial transaction and learn the PIN. A criminal may visually eavesdrop on a financial transaction by eyeballing or photographing the registered or authorized user of the debit card physically typing the PIN into a keypad. A criminal may pretend to talk on a mobile phone, while taking pictures using a camera built into the mobile phone. Criminals may be highly motivated, and may be very clever.

Thus, financial instruments such as credit cards are attractive and relatively soft targets for crude or for sophisticated criminal attack.

Hence a need exists for a different authentication factor which is more resistant to criminal attack than signatures, or three digit verification numbers, or debit card PINs. The different authentication factor may be used as a second authentication factor, for example, in place of a signature. Alternatively, the different authentication factor may be used as an additional authentication factor, for example, in place of a signature.

SUMMARY

The teachings herein alleviate one or more of the above noted dangers associated with traditional second authentication factors (such as signatures, three digit verification numbers, and debit card PINs). Traditional second authentication factors are susceptible to criminal attack primarily because (1) they typically reside on the physical card, and/or (2) they are reused for sequential transactions. If the second authentication factor resides on the physical card, then the second authentication factor is susceptible to physical theft of the card, and possibly susceptible to visual theft of information from the card. If the second authentication factor is reused for sequential transactions, then the second authentication factor is susceptible to eavesdropping. The eavesdropping may be electronic, or may be visual. Thus, the teachings herein provide authentication factors that: (1) do not reside on the physical card, and/or (2) are not reused for sequential transactions.

In some examples, an additional communication may be used as an additional authentication factor to authenticate a transaction. This additional communication may be a text message to a registered mobile phone, followed by an approval message from the same mobile phone. The text message may be sent by SMS (Short Message Service), and the approval message may also be sent by SMS.

In most of the examples, the additional communication comprises a verification indicia sent by an issuer to either a purchaser's mobile phone or to a third party's mobile phone. The purchaser or third party then responds to the verification indicia in such a way as to verify that the purchaser or third party has received the verification indicia. This response authenticates that the responder has physical control of the mobile phone, and thus serves as a second authentication factor. This response may be directly to the issuer, or may be routed through the merchant.

In some examples, an issuer's computer may: receive card information and financial transaction information from a merchant; authenticate (first authentication) the card information from the purchaser; and determine whether conditions associated with the card information trigger a required second authentication. When the conditions trigger a second authentication, the issuer's computer transmits a first verification indicia to a target address associated with the card information. When the issuer's computer receives a second verification indicia responsive to the first verification indicia, the issuer's computer determines whether the second verification indicia is authentic. If so, the issuer's computer transmits approval of the financial transaction to the merchant.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a flowchart illustrating an example of the process in which approval is transmitted from a Purchaser or a Third Party directly to an Issuer.

FIG. 4 is a flowchart illustrating an example of a Purchaser requested pre-approval transaction.

FIG. 5 is a flowchart illustrating an example of an Issuer transmitting a false denial to a Merchant, and transmitting a special verification indicia to a Purchaser.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various examples of two factor authentication disclosed herein relate to techniques and equipment for data processing, and in particular to authenticate financial transactions using at least two factors.

In some examples, the security of credit and debit transactions is enhanced by a method of two factor authentication that relies on a Purchaser's wireless device (such as a mobile phone) as a second form of authentication which requires the Purchaser to have physical possession of a physical object. The wireless device negates the need for additional and expensive hardware such as smart tokens. This second factor of authentication increases the confidence that only authorized persons are able to complete transactions with a given credit card or debit card.

Wireless devices such as mobile phones are becoming increasingly prevalent, and almost ubiquitous in today's society. The mobile phone owners maintain a strong sense of ownership and protection over such devices, and are often immediately aware if the mobile phone is stolen. Through methods such as passwords or PIN numbers on the mobile device, the owner of the device can limit usage to only authorized users. The authorized user may register the wireless device to be used for second factor authentication with a credit card account Reference now is made in detail to the examples illustrated in the accompanying drawings and discussed below. Terminology is introduced to facilitate the description of the drawings.

Figure 1:
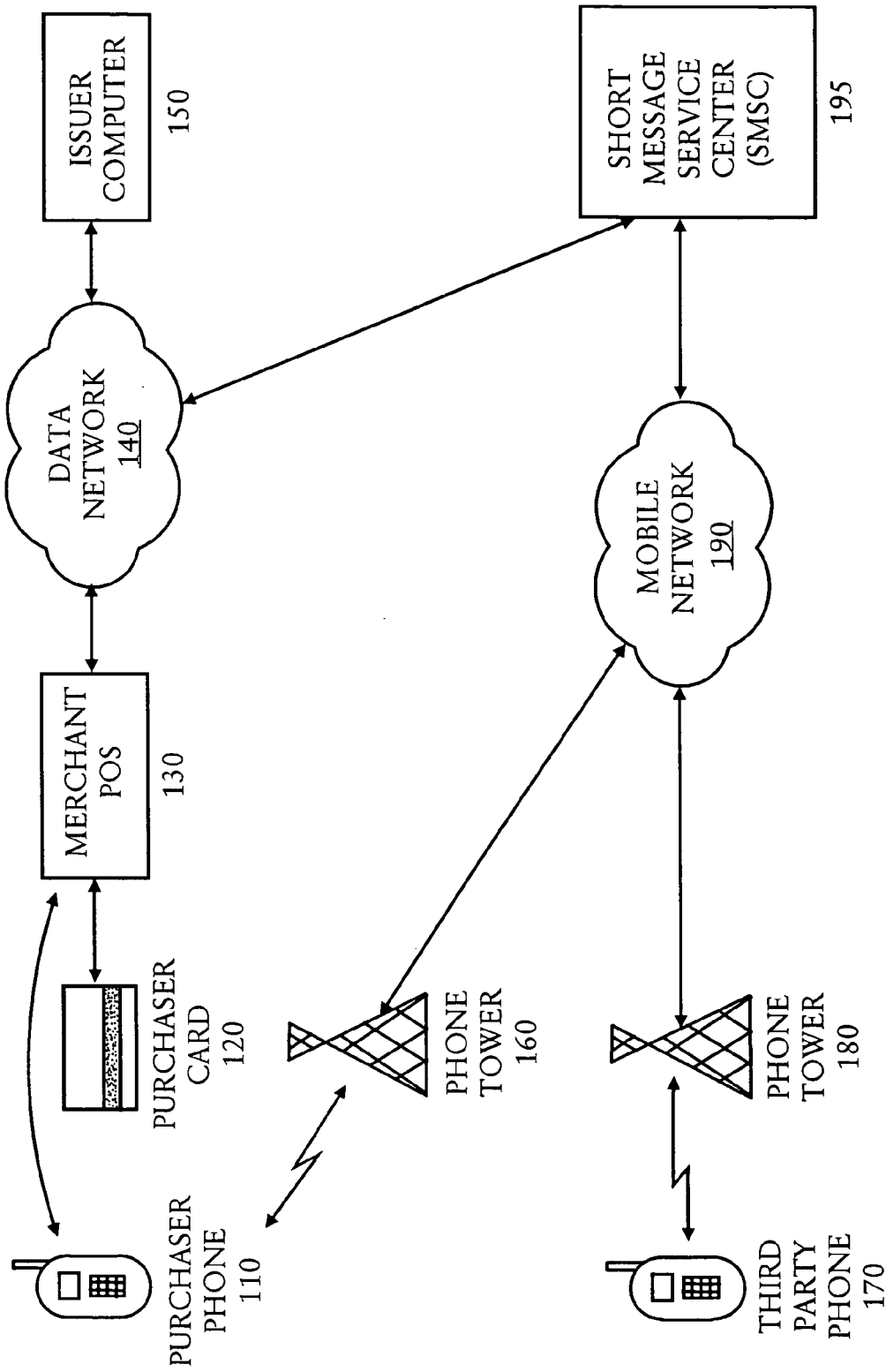
FIG. 1 illustrates an example of financial transaction communications among various entities.

FIG. 1 illustrates an example of financial transaction communications among various entities. The entities include a purchaser, shown as having a mobile phone 110 and a card 120.

A Purchaser is a registered or authorized user of a card, and is a person or entity associated with the account identified by the information on the card 120. The Purchaser may be authorized to use the card 120, but may require additional authorization from a Third Party to use the card under some conditions. In the example, the third party also has a wireless device such as a mobile phone 170.

A "card" is defined broadly as a physical instrument carrying information adequate to identify a credit account, debit account, prepaid account, gift account, service account, or other account that may be involved in a financial transaction.

A card may be used for a purchase of goods or services, or for entering into a contract to purchase goods or services, depositing or withdrawing finds, etc. A card may also be used as a form of identification.

The term "card information" refers to account identifying information or the like, and the term "card information" may be used to emphasize that the physical card is not necessary, for example during a financial transaction from a Merchant website. Typically a Personal Account Number (PAN) is adequate to identify an account. A PAN typically comprises: an issuer identification number (IIN), an individual account identification, and a check digit.

A physical card typically comprises a physical medium with: an embossed PAN, an embossed expiration date, an embossed cardholder's name, logos, a hologram (which is an efficient visual method for card authentication), a magnetic stripe, and a tamper evident signature band. The tamper evident band should contain an original signature by the Purchaser. A Merchant may compare the original signature on the tamper evident band against the Purchaser's signature on a receipt, and thus authenticate that the Purchaser is genuine. The tamper evident band typically has supplemental security data, such as a 3 digit "verification number." This 3 digit verification number is typically used in internet or call center transactions to authenticate that the Purchaser has physical possession of the card. The magnetic stripe can store up to 3 tracks of data. Tracks 1 and 2 are read only, and track 3 is read/write. These tracks contain extensive financial data, and parameters that assist risk management. "Smart cards" with chips (integrated circuits) may hold substantial amounts of information, and may also contain RFID (radio-frequency identification) circuitry. Smart cards may be implanted under the skin of the Purchaser. Smart cards may store a list of one-time PINs (a rolling code), which must be used in order. Thus, a criminal that eavesdrops on a financial transaction will not know the next one-time PIN. A registered card is a card that is registered or designated or enabled for two factor authentication, and has an associated target address. Authentication utilizing the target address is required under certain triggering conditions, for example if a transaction exceeds $100.

A Merchant is an entity selling (or renting) goods or services or contracts. A merchant may be located at a physical location such as a physical store, or may be located at a non-physical or virtual location such as an internet site or a phone answering site. The Merchant may accept card information as a means of payment. The Merchant may have equipment for selling or renting goods or services or contracts, such as: cash register, card magnetic stripe reader, digital signature recording screen, PIN keypad, and computer.

For the purposes of discussion, the exemplary Merchant has a Merchant Point-Of-Sale (POS) system 130 comprising the equipment just mentioned. The Merchant may send a message to an Issuer computer 150 through a data network 140. The data network 140 may be a high speed digital network including fiber optic cable, or may merely be a simple audio telephone network that allows a Merchant's cashier to speak with an Issuer's clerk.

An Issuer is an entity that may approve a financial transaction, and comprises one or more of: the merchant's bank, an international credit-card network, a clearinghouse or intermediary, and a card issuing bank. The Issuer may have substantial equipment used for approving a transaction, such as: server computers, host computers, terminal/workstation computers, and communications networks. Typically an Issuer will have at least one Issuer computer 150 which automatically responds to communications from a Merchant. The Issuer computer 150 may send a text message to a target address.

A target address is an address associated with a card account, and with a person having a device capable of receiving information from the Issuer. In several examples, the target address is the phone number of a wireless phone carried by a Purchaser, such as Purchaser phone 110. Other examples address the phone 170 or other device of a third party associated with the card account. Other examples of target address are: the number of a beeper capable of displaying codes, or an Internet addresses. In some embodiments, a target device associated with a target address must be capable of two-way communication with the Issuer. In some embodiments, the target device may have a unique hardwired unique identification code, such as the electronic serial number (ESN) used by wireless phones.

The text message sent by the Issuer computer 150 may travel though the data network 140 to a Short Message Service Center (SMSC) 195. The SMSC 195 typically provides a number of services, including the regulation of the transfer of text messages between mobile phones, or between wireline terminal devices and mobile phones. When a mobile phone user sends a text message (SMS message) to a recipient, for example, the sender's mobile phone actually sends the message to the SMSC. The SMSC stores the message and then delivers it to the destination recipient when they are available. The SMSC usually has a configurable time limit for how long it will store the message, and the user can usually specify a shorter time limit if they want. Additionally the message centre will take care of any charging that needs to take place. Generally speaking there is at least one Short Message Service Center (SMSC) per network. For bulk transmission and reception of SMS messages, SMSC's have conventional, fixed, network interfaces as well as mobile network interfaces. A number of protocols have been defined to support this sort of wire-line access. SMPP is the most commonly used of these protocols. For purposes of second factor authentication, the SMSC 195 may deliver a text message to the Purchaser phone 110 or the Third Party phone 170 via a mobile network 190.

The mobile network 190 is a set of facilities operated by a carrier for the purposes of providing public mobile telecommunications services. These facilities, for example, may include a mobile telephone switching office (MTSO) which is the central coordinating element for all cell sites, contains the cellular processor and cellular switch. Further, these facilities may include data only networks, fixed wireless and wired networks, etc, and may use various technologies such as WiMAX, MuniWiFi, etc. The MTSO (not shown) interfaces with telephone company zone offices, controls call processing and handles billing activities. Typically these billing activities are related to SMS processing and delivery, and not payment to the Merchant or Issuer. The cell sites are radio base station sites such as a phone tower 160 and a phone tower 180.

The phone tower 160 may transmit a text message to the Purchaser phone 110. The Purchaser may respond to the text message in at least two ways. First, the Purchaser may supply the text message to the Merchant POS terminal 130. For example the Purchaser may type a four digit PIN into a keypad at the Merchant POS terminal 130. Second, the Purchaser may reply to the text message by sending a new text message. For example, the Purchaser may send the text message "yes" to the Issuer computer 150 (via the phone tower 160, mobile network 190, SMSC 195, and data network 140).

Similarly, the phone tower 180 may transmit a text message to a Third Party phone 170. A Third Party is a person or entity (other than the Purchaser), who is required to authenticate a transaction by the Purchaser. For example, the Third Party may be a parent who will authenticate any purchase over $100 by a child. The Third Party may also be known as known as an alternate approver. The Third Party may reply to the text message by sending a new text message. For example, the Third Party may send the text message "yes" to the Issuer computer 150 (via the phone tower 180, mobile network 190, SMSC 195, and data network 140). Alternatively, the Third Party may forward the text message to the Purchaser phone 110 (via phone tower 180, mobile network 190, SMSC 195, mobile network 190, and phone tower 160).

Figure 2:
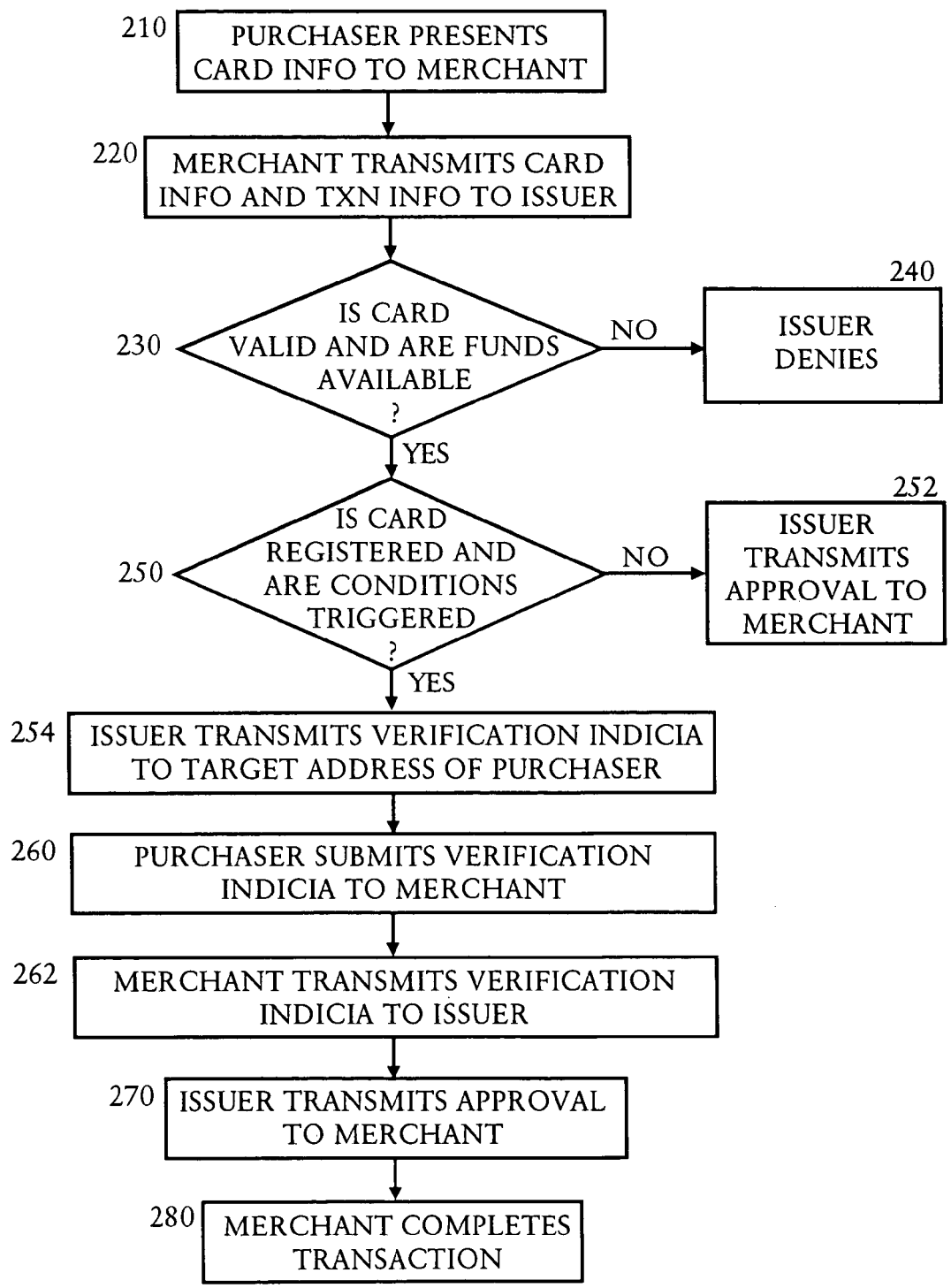
FIG. 2 is a flowchart illustrating an example of communication of verification indicia transmitted through a Merchant.

FIG. 2 is a flowchart illustrating an example of communication of verification indicia transmitted through a Merchant.

Specifically, verification indicia are transmitted to a target address of a Purchaser, and the Purchaser transmits the verification indicia through the Merchant to the Issuer as an additional factor for authentication.

At step 210, the Purchaser presents the Purchaser card 120 to the Merchant POS 130 as payment for a gallon of milk (a financial transaction). Typically the Purchaser will swipe the Purchaser card 120 through a magnetic stripe card reader at the Merchant POS 130.

At step 220, the Merchant POS 130 transmits the card information and transaction information to an Issuer computer 150 via a data network 140. The transaction information may comprise the total cost of the milk including taxes, the identity of the Merchant, the location of the Merchant's identity, the date, the time, and a code identifying the specific transaction.

At step 230, the Issuer computer 150 may perform initial analysis such as checking if the card information is valid (an account exists, not expired, not reported stolen, etc.), and checking if sufficient funds are available under the terms of the particular type of account. Funds may be available through overdraft protection for some Purchasers. This initial analysis authenticates that the Purchaser knows or has at least one authentication factor, for example a valid card account number and possibly an associated PAN (Personal Account Number).

Authentication is proving, or serving to prove, or confirming that the Purchaser is the genuine or authentic person authorized to use a card or account. Authentication may be based determined by various factors. One factor may be knowledge (knowing a PAN and/or a PIN), a second factor may be possession (possessing a physical card, or possessing a mobile phone).

Available funds is the total amount of cash and/or credit that an Issuer is willing to approve for a financial transaction. Available funds typically is: (1) cash available in an account; or (2) credit available in an account, or (3) cash available in an account plus overdraft protection available for the account.

If the initial analysis at step 230 is unfavorable, then the process branches to step 240 for denial. If the initial analysis is favorable, then the process branches to step 250 for approval. This initial analysis is also known as "first order approval" in the card industry.

At step 240 (if step 230 has determined that the card information is not valid, or some other portion of the initial analysis is unfavorable), the Issuer denies approval. This denial typically is promptly transmitted to the Merchant, and the Merchant then refuses to complete the transaction with the Purchaser. This denial is typically accompanied with codes explaining the reason for the denial. Specifically, the Issuer computer 150 will transmit a denial to the Merchant POS 130 (via data network 140).

At step 250 (if step 230 has determined that the card information is valid, and the remainder of the initial analysis is also favorable), the Issuer computer 150 performs additional analysis. The additional analysis comprises checking if the card information is registered for possible additional authentication, and whether any triggering conditions are satisfied. If the card information is not registered, or if triggering conditions are not satisfied, then the process branches to step 252 for approval. If the card information is registered and the triggering conditions are satisfied, then the process branches to step 254.

Triggering conditions are any conditions that the Issuer believes create an need for additional authentication. Exemplary triggering conditions comprise one or more of the following: (1) any purchase over a set amount (perhaps $100) may require additional authentication; (2) any purchase over a set total amount in a single day (perhaps $500) may require additional authentication; (3) any transactional behavior that the Issuer identifies as having an increased probability of fraud; or (4) all purchases. The issuer may apply one or more different triggering conditions on each account based on the terms of the account agreement, based on customer instructions, based on a past history of the account, and so forth.

Transactional behavior that has an increased probability of fraud may be relatively complex (for example, a small gasoline purchase from a gasoline pump promptly followed by an attempted large purchase). A criminal may test a stolen card at a gasoline pump (with a built in card reader, and without nearby surveillance cameras) to find out if the card is valid and has funds available. If the gasoline purchase is successful (the card has not been reported as stolen), then the criminal may promptly attempt a large purchase at a Merchant's physical POS.

Thus, triggering conditions may be: conditions explicitly negotiated between the Issuer and the Purchaser, and/or conditions that the Issuer does not explicitly disclose to the Issuer, and/or conditions that the Issuer has not yet determined. The Issuer may offer preferred rates or other benefits to a Purchaser that agrees to triggering conditions that reduce the risk of criminal activity and the financial losses associated with criminal activity.

Alternatively, a Purchaser may agree to pay additional fees or rates in order to reduce the financial risk and inconvenience associated with inappropriate or criminal use of the card information. Some Purchasers may want restrictions on certain cards, for example, for parental control/confirmation on a child's credit card.

At step 252 (if step 250 has determined that the card is not registered or triggering conditions are not satisfied), the Issuer transmits approval to the Merchant. Specifically, the Issuer computer 150 transmits an approval to the Merchant POS 130 (via data network 140).

At step 254 (if step 250 has determined that the card information is registered, and that the conditions associated with the card information are triggered), the Issuer transmits verification indicia to a target address associated with the Purchaser, such as the telephone number of Purchaser phone 110. For example, the verification indicia may be a character string such as four digits sent as a text message. Specifically, the Issuer computer 150 transmits the verification indicia to the Purchaser phone 110 (via data network 140, SMSC 195, mobile network 190, and phone tower 160.

Verification indicia are distinctive marks, or alphanumeric characters, or an image, or any form of stored information. Examples of verification indicia are: a signature, a PIN (personal identification number), a bar code, an image, a text message, a voice message, a zip code, or a rolling code which changes after each use.

Verification indicia may be unique, or may be non-unique. For example, a four digit PIN for a debit card transaction may be non-unique (in the sense that more the same four digits may be used for a different transaction by a different Purchaser). However, four digits are generally enough to foil a criminal that is merely trying random numbers, because the criminal should be "locked out" (transaction cancelled, and perhaps the debit card invalidated) after three failed attempts.

A typical PIN associated with a debit card is reused by the Purchaser for multiple transactions. However, a PIN used as a verification indicia in FIG. 2 is intended to be used only once. In other words, a "one-time" PIN is a verification indicia (preferably a string of characters) intended to facilitate a single transaction. Other types of verification indicia may comprise one or more of the following: a machine readable image (such as a bar code), a machine generated voice (stating "one-five-three-six-eight"), or a series of tones (similar to tones generated by telephone keys).

Special verification indicia are verification indicia that are particularly attractive because they may be seamlessly integrated into a Merchant's existing hardware and software. Specifically, there are at least four types of special verification indicia: (1) a one-time PIN (typically four digits) for a debit card transaction with a physical or virtual Merchant; (2) a one-time three digit verification number (similar to the three digit verification number on the tamper resistant band on the back of a credit card) for a credit or debit card transaction with a virtual Merchant; (3) a one-time 5 digit verification number (similar to a zip code) for a transaction with a physical Merchant; or (4) a one-time full set of card information.

At this step, a criminal that has stolen the card (or the card information) will not receive the verification indicia via the mobile phone, and will not be able to complete the transaction. The criminal must have physical possession of the mobile phone (or at least an ability to eavesdrop on transmissions to the mobile phone) in order to continue.

If a mobile phone is used, this facilitates a two factor authentication wherein at least one of the authentication factors requires present possession of a physical object (the mobile phone). As discussed above, all the information on a card may be read (through temporary possession or eavesdropping) and used to generate a criminal duplicate card, and the Purchaser and Issuer may not be aware that a criminal duplicate card has been generated.

However, the Purchaser generally will promptly realize if his mobile phone has been stolen. Further, the mobile phone has special features which facilitate extremely high security measures. A mobile phone has a unique identification code embedded or hardwired into the phone by the manufacturer. This code typically is 15 digit number, and is also known as an ESN (electronic serial number). No two phones ever have the same ESN.

Each time a call is placed, the ESN is automatically transmitted to the base station so that the wireless carrier's mobile switching office can check the call's validity. The ESN cannot be altered in the field. The ESN differs from the MIN (mobile identification number). The MIN is the wireless carrier's identifier for a phone in the network. The network operator also assigns a mobile directory number (MDN) to each phone and programs it into the phone. ESNs, MINs and MDNs are electronically checked and verified before permitting the mobile phone to communicate. The Issuer computer 150 may also check the ESNs, MINs and MDNs against values registered with or associated with an account.

Even if a criminal duplicates or simulates the Purchaser phone 110, the criminal would need to find a way to at least temporarily disable the Purchaser phone 110 during the criminal transaction so that the Purchaser phone 110 would not be alerted by receiving the verification indicia (related to a criminal transaction) from the Issuer.

Alternatively, the target address may correspond to a PDA (Personal Data Assistant) such as a Blackberry® device, or a beeper with a numeric display, or an internet address, or a fax machine, or any device capable of receiving the verification indicia from the Issuer.

Additionally, during step 254, the Issuer computer 150 may also send a message to the Merchant POS 130 indicating, for example, that: (1) first order approval has been granted, and (2) the card is registered and the conditions are triggered, and (3) verification indicia has been sent (or is being sent, or will be sent) to the target address of the Purchaser, and (4) verification indicia is required to approve the transaction. Thus, the Merchant's cashier may verbally prompt the Purchaser to check his phone for verification indicia from the Issuer. This process may require changes to the Merchant's software and hardware and procedures, in order to require and accept the verification indicia from the Purchaser as an additional step. Special verification indicia may not require changes to the Merchant's software, and are discussed in a separate section below.

At step 260, the Purchaser reads the verification indicia from the Purchaser phone 110, and submits the verification indicia to the Merchant POS 130. For example, the Purchaser may type a four digit verification indicia into a Merchant keypad. The keypad may be the same keypad which is also used for entering PINs during debit card transactions. Thus, in some examples the Merchant may not require additional hardware.

Other types of verification indicia may be used. For example, a blind person may prefer that the verification indicia be audio (such as the words "one-two-three-four" spoken over the mobile phone). The verification indicia may be a bar code or other coded image displayed on a mobile phone screen. The coded image verification indicia may be transmitted to the Merchant by passing the mobile phone screen over the Merchant's optical bar code reader.

A one-time PIN is a verification indicia (preferably a string of characters) intended to facilitate a single transaction. Other types of verification indicia may comprise one or more of the following: a machine readable image (such as a bar code), a machine generated voice (stating "one-five-three-six-eight"), or a series of tones (similar to tones generated by telephone keys).

Other methods of submission or transmission from the Purchaser to the Merchant may be used. For example, the Purchaser may simply verbally state a four digit verification indicia, and the Merchant may type this indicia into a Merchant terminal. Criminal eavesdropping is not a major concern during this transmission from Purchaser to Merchant, because the indicia typically is only useful for the specific transaction which is in progress.

Many other methods of submission from the Purchaser to the Merchant are known in the art. The Purchaser may forward the verification indicia from the Purchaser phone 110 to a Merchant phone number or Merchant Internet address, particularly if the verification indicia carried information identifying the particular transaction which was underway. Thus, the Merchant could associate the verification indicia with the proper transaction.

The Purchaser may submit the verification indicia by a copper wire communication line such as a USB (Universal Serial Bus) that connects the Purchaser phone 110 or PDA to the Merchant's POS 130 cash register or terminal. Alternatively, the Purchaser may submit the verification information using Bluetooth, infrared, or other information transmission methods known in the art.

At step 262, the Merchant POS 130 transmits the verification indicia to the Issuer computer 150 (via the data network 140). If the verification indicia is simple (such as a four digit code), then the Merchant may add information identifying the transaction. Alternatively, if the transaction indicia is relatively complex (perhaps a 20 digit code) then the verification indicia may already be uniquely associated with a specific transaction, and the Merchant may not need to add information identifying the transaction.

At step 270, the Issuer computer 150 checks that the verification indicia received from the Merchant POS 130 matches the verification indicia sent to the Purchaser target address.

The example illustrated in FIG. 2 routes the verification indicia from the Issuer, to the Purchaser target address, to the Merchant, and finally back to the Issuer. By this process, the Issuer authenticates that the Purchaser has present access to the Purchaser target address. This authentication is in addition to the authentication discussed in step 230. In other words, step 230 authenticates one factor (knowing card information, or possessing a physical card), and step 270 authenticates an additional factor (such as possessing the mobile phone).

Authentication is proving, or serving to prove, or confirming that the Purchaser is the genuine or authentic person authorized to use a card or account. Authentication may be determined by various factors. One factor may be knowledge (knowing a PAN and/or a PIN), a second factor may be possession (possessing a physical card, or possessing a mobile phone).

Preferably, if mobile phones are used, the Issuer authenticates that the Purchaser has present physical possession of the mobile phone associated with the target address. For high security, the Issuer may require that a specific mobile phone (with a unique hardwired identification code or ESN) be associated with a specific card. For example, as part of the application process for a card, the Issuer may send a test message to the target address, and may require a response to the test message from the mobile phone associated with the target address. The response from the mobile phone should include the unique hardwired identification code associated with the mobile phone. In the case of call forwarding, a response from a different phone would not include the proper ESN, and would not be acceptable. In the example of FIG. 2, the step 260 transmission of verification indicia from the Purchaser to the Merchant may also include the unique hardwired identification code associated with the mobile phone.

The transaction may "time-out" after a predetermined amount of time has passed. In other words, if the Issuer has not received the verification indicia promptly (perhaps one minute) after sending the verification indicia to the target address, then the Issuer may deny the transaction.

At step 280, the Merchant receives approval from the Issuer, and completes the transaction with the Purchaser.

To summarize, FIG. 2 illustrates an example wherein: an Issuer transmits verification indicia to a Purchaser target address, the Purchaser transmits the verification indicia to a Merchant, and the Merchant transmits the verification indicia back to the Issuer. By this process, the Issuer authenticates that the Purchaser has received the verification indicia, and thus the Purchaser is the genuine or authentic person authorized to use a card for the specific transaction.

FIG. 3 is a flowchart illustrating an example of the process in which approval is transmitted from a Purchaser or a Third Party directly to an Issuer.

Steps 310, 320, 330, 340, 350, and 352 in FIG. 3 are respectively identical to steps 210, 220, 230, 240, 250 and 252 in FIG. 2. These steps have already been discussed in detail above.

At step 354, the Issuer computer 150 transmits a message to a target address associated with the Purchaser, and/or a target address associated with the Third Party. The message may be adapted for a specific software application such as BREW, or JAVA, or POCK.

The Third Party is an entity other than the Purchaser, and the Third Party may be required to approve some or all transactions, depending upon the triggering conditions. Alternatively, the Third Party may merely want to be notified about some or all transactions.

For example, the Third Party may be a parent, and the Purchaser may be a student attending the University of State1. The triggering condition may be any transaction over $100, or any transaction located in a state other than State1. The message may contain substantial information about the transaction, such as the amount, the name of the Merchant, and the location of the Merchant. The Third Party, e.g. parent, might not approve a transaction for $450 at "Joe's Hard Liquor Store" located in State2. Alternatively, the Third Party might approve a transaction for $250 at "University Bookstore" located in State1. Thus, these Third Party processes may be used to prevent inappropriate actions by the Purchaser, in addition to preventing criminal actions by a criminal.

Typically the transaction information transmitted from the Merchant to the Issuer does not identify the specific goods or services involved in the transaction. However, the Third Party may request this additional information after receiving the message from the Issuer. Alternatively, the Issuer may request this information from the Merchant prior to sending a message to the Third Party. This additional transaction information may require changes to the Merchant software.

The message to the Third Party may take many forms. For example, a text message, a verbal message, an image of the Purchaser (or criminal) taken by a surveillance camera of the Merchant, an email, and so forth.

Further, the message may include verification indicia as discussed above regarding step 254 of FIG. 2.

At step 360, the Purchaser phone 110 or the Third Party phone 170 transmit approval directly to the Issuer computer 150. The term "directly" in this context is used to stress that the Merchant POS 130 is not in the transmission path. Instead, approval is transmitted "directly" via phone tower 160 (or 180), mobile network 190, SMSC 195, data network 140, to Issuer computer 150.

The transmitted approval may take many forms. A simple response, such as pressing the "1" key on a mobile phone, may authenticate possession of the phone by somebody who approves the transaction. A verbal response of "yes" may be recognized as the word "yes" by an voice recognition system.

Additionally, a verbal response may be used to authenticate the identity of the person possessing the phone. For example, the Third Party may respond by speaking into the Third Party phone 170 so that the Issuer computer 150 may perform voice identification, and match the response voice audio signal to a previously recorded voice from the Third Party. Thus, the response may serve multiple purposes: authenticate possession of the phone by some entity that approves the transaction (voice recognition), and authenticate the identity of the entity that approves the transaction (voice identification).

Speech recognition is a function implemented by software or hardware that analyzes audio signals, and extracts words from the audio signals. Voice identification is a function implemented by software or hardware that analyzes audio signals, and determines whether the audio signals match previously recorded audio signals from a specific person (like fingerprints, although not as accurate). Voice identification is related to speech recognition, but the purposes are very different.

Alternatively, the Third Party may respond by enter a PIN (which is not known to the Purchaser) into the keypad of the Third Party phone 170 and send the PIN as a text message to the Issuer computer 150, in order to simultaneously approve the transaction and authenticate the identity of the Third Party. This authentication requires knowledge of the PIN, and possession of the Third Party phone 170.

The conditions at step 350 may trigger different messages associated with various levels of security. Returning to the example of the Third Party parent and the Purchaser student, there may be four levels of security: (1) less than $50 in State1 may be minimum security, and the Issuer transmits approval directly to the Merchant POS 130 per step 352; (2) from $50 to less than $100 in State1 may trigger a message to the Purchaser phone, and merely require pressing the "1" key to indicate approval; (3) any transaction over $100 in State1 may trigger a message to the Third Party phone, and merely require pressing the "1" key to indicate approval; or (4) any purchase outside of State1 may trigger a message to the Third Party phone, and may require a verbal response from the Third Party which is subjected to voice identification against a previously recorded voice from the Third Party.

Alternatively, messages may be sent to both the Purchaser and the Third Party, and approval may be required from either, or from both.

Rolling sums may also be used as triggers. For example, over $100 in one day, or over $500 in one week may require approval from the Third Party.

At step 370, the Issuer computer 150 determines whether valid approval has been received from the Purchaser or the Third Party. As discussed above, this determination may be dependent upon the transaction details and the triggering conditions. Additionally, the transaction may "time-out" if no approval is received within a predetermined period of time after the message is transmitted in step 354. If a valid approval is not received, then the process branches to step 372 for denial. If a valid approval is received, then the process branches to step 374 for approval by the Issuer computer 150.

At step 372, the Issuer computer 150 denies the transaction, and typically sends an appropriate denial message to the Merchant POS 130.

At step 374, the Issuer computer 150 approves the transaction, and typically sends an appropriate approval message to the Merchant POS 130.

At step 380, the Merchant POS 130 completes the transaction with the Purchaser.

To summarize, FIG. 3 illustrates an Issuer transmitting a message to a Purchaser target address or a Third Party target address, the Purchaser or Third Party transmitting approval directly (not through the Merchant) to the Issuer, and the Issuer transmitting approval to the Merchant.

FIG. 4 is a flowchart illustrating an example of a Purchaser requested pre-approval transaction.

At step 410, the Purchaser determines one or more of the following restrictions for a future transaction: (1) a cost (such as an estimated maximum transaction cost); (2) a Merchant; (3) a geographic location; or (4) a period of time. Regarding the cost, the Purchaser may estimate a maximum transaction cost for a future transaction. Alternatively, the Purchaser may estimate an expected transaction cost. Ideally, the Purchaser may determine the exact transaction cost. The most common restriction will probably be an estimated maximum transaction cost.

At step 420, the Purchaser requests pre-approval directly from an Issuer for a future transaction. Typically the Purchaser will use the Purchaser phone 110 to directly (without the Merchant) communicate with the Issuer computer 150 (via phone tower 160, mobile network 190, SMSC 195, and data network 140). For example, the request may be a simple text message stating "request 500." Alternatively, the Purchaser may request pre-approval through an Internet site associated with the Issuer computer 150.

The request will include at least one restriction: the transaction amount (cost), the Merchant, the geographic location; or the period of time. The request may include card information such as an account number or PAN, or other information adequate to identify the account. For example, a request from a mobile phone may automatically include the ESN (electronic serial number), and the ESN may be used to identify an account.

At step 430, if the Issuer computer 150 determines that the card information is valid and funds are available, then the process branches to step 434 for pre-approval. If the Issuer determines that the card information is not valid or funds are not available, then the process branches to step 432 for denial.

Additionally, at step 430, in the simplest case the Issuer will determine if funds are available by merely comparing the requested transaction amount against the funds available. As previously discussed, overdraft protection of various types may be included in calculating the funds available.

In more complex variations, the Issuer may require that the funds available additionally contain a safety margin (above and beyond the requested transaction amount). The safety margin may comprise: (1) a preset amount, such as $100; (2) a preset percentage, such as 20% of the estimated maximum transaction cost; or (3) the greater of a preset amount or a preset percentage.

At step 434, the Issuer computer 150 pre-approves the transaction (subject to the restrictions) and transmits pre-approved verification indicia to a Purchaser target address. For example, the target address may be a mobile phone number of the Purchaser phone 110. The Issuer may place a hold on available funds for the requested cost, and optionally for the safety margin. As discussed above regarding FIG. 2, the verification indicia may take many forms. Additionally, the pre-approved verification indicia may be information equivalent to a full set of new card information for the pre-approved transaction.

The pre-approval and any hold on funds may "time-out" if the approved transaction does not occur within a set period of time (for example, within 48 hours). In other words, there may be a default restriction for the period of time.

At step 440, the Purchaser submits the pre-approved verification indicia to a Merchant POS 130 in support of a financial transaction (similar to step 260 of FIG. 2). As discussed above regarding FIG. 2, the Purchaser may submit verification indicia to the Merchant by many different methods. The pre-approved verification indicia may a one-time PIN for a debit card transaction, or may be a set of information for use as a one-time card. If the pre-approved verification indicia is a one-time four digit PIN for a debit card transaction, then the financial transaction may proceed seamlessly, without any need for the Merchant to obtain additional software or hardware, and perhaps without the Merchant even knowing that the financial transaction was pre-approved.

Alternatively, some types of pre-approval indicia may require additional software or hardware, as discussed above regarding FIG. 2.

At step 450, the Merchant POS 130 transmits the pre-approved verification indicia to the Issuer computer 150. The Merchant may simultaneously transmit transaction information and card information to the Issuer. The transaction information provided by a Merchant to an Issuer during a credit card transaction typically includes: total transaction cost, Merchant identification, Merchant location, and date. Thus, this transaction information may be used by the Issuer (in the next step) to determine whether the restrictions are satisfied.

At step 460, the Issuer computer 150 determines if funds are available, if the pre-approval verification indicia is proper, and if the restrictions are satisfied. If funds are available, and the pre-approval verification indicia is proper, and the restrictions are satisfied, then the process branches to step 464 for approval. Otherwise, the process branches to step 462 for denial. Additionally, the Issuer may determine whether the card is still valid at step 460.

At step 462, the Issuer computer 150 denies approval, and may transmit an appropriate message to the Merchant POS 130, and possibly also transmits an appropriate message to the Purchaser phone 110.

At step 464, the Issuer computer 150 approves the transaction, and transmits an appropriate message to the Merchant POS 130, and possibly also transmits an appropriate message to the Purchaser phone 110.

At step 470, the Merchant POS 130 completes the transaction. Additionally, the Issuer computer 150 may release any hold on any unused available funds after the transaction is completed.

To summarize, FIG. 4 illustrates an example wherein a Purchaser determines at least one restriction for a future transaction, the Purchaser requests pre-approval from an Issuer, the Issuer transmits pre-approved verification indicia to a Purchaser target address, the Purchaser transmits the indicia to a Merchant, the Merchant transmits the indicia and transaction information to the Issuer, and the Issuer approves the transaction.

FIG. 5 is a flowchart illustrating an example of an Issuer transmitting a false denial to a Merchant, and transmitting a special verification indicia to a Purchaser.

Special verification indicia are certain examples of verification indicia that are particularly attractive because they may be easily integrated into a Merchant's existing hardware and software. Specifically, there are at least four examples of special verification indicia for consideration here: (1) a one-time PIN (typically four digits) for a debit card transaction with a physical or virtual Merchant; (2) a one-time three digit verification number (similar to the three digit verification number on the tamper resistant band on the back of a credit card) for a credit or debit card transaction with a virtual Merchant; (3) a one-time 5 digit verification number (similar to a zip code) for a transaction with a physical Merchant; or (4) a one-time full set of card information. In other words, these special verification indicia mimic (and displace) a portion of pre-existing card information. These special indicia represent a special case of FIG. 2, as will be illustrated below.

A false denial is as a denial which is sent from an Issuer to a Merchant, at approximately the same time as a special verification number is sent from an Issuer to a target address. This false denial is part of a "deny and submit" strategy for submitting special verification indicia through the Merchant without modifying existing Merchant software. The Issuer intends to approve the transaction after receiving the special verification indicia from the Merchant.

Steps 510, 520, 530, 540, 550, and 552 in FIG. 5 are respectively identical to steps 210, 220, 230, 240, 250 and 252 in FIG. 2. These steps have already been discussed in detail above.

At step 554, the Issuer transmits a special verification indicia to a target address of the Purchaser, and contemporaneously transmits a false denial to the Merchant.

For example, the Issuer computer 150 transmits special verification indicia to the Purchaser phone 110 (via data network 140, SMSC 195, mobile network 190, and phone tower 160). The Issuer computer 150 also contemporaneously (at about the same time) transmits a false denial to the Merchant POS 130.

For example, the special verification indicia may be a one-time PIN (typically four digits) for a debit card transaction with a physical Merchant. At step 554, the Issuer transmits the one-time PIN (typically four digits) to the Purchaser, and additionally transmits a denial to the Merchant (not shown in FIG. 2). Preferably, the special verification indicia is transmitted as a text message, and is received on the Purchaser's mobile phone 110.

The false denial to the Merchant may contain a message stating that the PIN is not correct, and requesting that the Purchaser attempt to re-enter a correct PIN. This message may be displayed at a Merchant's customer keypad without any additional action by the Merchant's cashier. The Purchaser may then enter the "correct" one-time PIN (special verification indicia) that was received at the Purchaser target address. This type of denial is called a false denial. The denial is "false" because the PIN initially submitted was correct, but the Issuer wants to manipulate the Merchant into requesting and accepting a special verification indicia. In other words, the false denial effectively serves as a request (to the Merchant and to the Purchaser) to please submit the special verification indicia.

The other special verification indicia may be used in similar fashion. The Issuer sends special verification indicia to the Purchaser target address, and falsely denies approval to the Merchant.

At step 560, the Purchaser submits the special verification indicia to the Merchant by typing a one-time PIN into the keypad. This step appears to resubmit a PIN, but actually transmits the special verification indicia for the first time. Thus, this use of special verification indicia is called "deny and submit." To the Merchant, it appears that an incorrect PIN was denied during a first attempt, and that a correct PIN was submitted during a second attempt.

At step 562, the Merchant transmits the transaction information and card information to the Issuer. However, the card information now includes the special verification information (a one-time PIN). The special verification indicia has replaced (or more accurately, has temporarily displaced) a portion of the card information which was initially transmitted to the Issuer at step 520.

The Merchant may merely observe that the initial PIN was denied or rejected, and that the second PIN (special verification indicia received at the Purchaser target address) was accepted. The Merchant does not have to purchase any hardware or software to implement the use of special verification indicia, and may even be unaware of the special verification indicia.

Verification indicia that is not special (for example, a bar code image) would require modification to at least the software at the Merchant POS 130. For example, the Merchant POS 130 would need to (1) receive communications from the Issuer computer 150 that requested additional verification indicia from the Purchaser, (2) accept the verification indicia from the Purchaser, (3) associate the verification indicia with the transaction, and (4) transmit the verification indicia with some transaction identification to the Issuer computer 150.

In other words, verification indicia that does not mimic standard card information probably will require special handling procedures at the Merchant POS 130, and probably will require new software. Verification indicia that is numerical ("123456789") may be transmitted through text messages to the Purchaser phone 110, and may be typed by the Purchaser into a keypad at the Merchant POS 130 which is typically used for debit card PINs. However, a nine digit verification indicia cannot be used as a four digit PIN, because nine digits do not fit into a four digit field. Similarly, a verification indicia that was a bar code could be transmitted to the Purchaser phone as an image, and could be displayed as an image on the Purchaser phone, but the Merchant POS 130 bar code scanning software would need to be modified to recognize that the image was a verification indicia (and not a standard UPC bar code), and would need to be modified to properly transmit the verification indicia to the Issuer computer 150.

Additionally, verification indicia that does not mimic standard card information probably will require new software throughout the entire financial transaction system, including, for example: the Merchant's bank, an international credit card network, and the card issuing bank.

At step 570, the Issuer transmits approval to the Merchant. For example, the Issuer computer 150 transmits approval to Merchant POS 130 via data network 140.

At step 580, the Merchant completes the transaction.

Each of the four special verification indicia listed above has advantages and disadvantages. (1) The one-time PIN (typically four digits) for a debit card may be used for physical or for virtual Merchants. However, it may not be used for a credit card transaction. (2) The one-time three digit verification number (similar to the three digit verification number on the tamper resistant band on the back of a credit card) may be used for either a credit or a debit card transaction. However, the three digit verification number is typically used only with a virtual Merchant (Internet site or calling center), and thus may not be used for a physical Merchant. (3) The zip code is typically only used by physical Merchants in certain geographic areas. This, the one-time zip code may have very limited application. (4) The one-time full set of card information has the broadest application (credit cards, debit cards, physical Merchants, and virtual Merchants), but may inconveniently force the Purchaser and the Merchant to terminate the transaction and start a new transaction. The Purchaser may then attempt an identical purchase from the Merchant using the one-time card information (which may be completely different from any card information previously transmitted to the Merchant). In this case (false denial and one-time full set of card information), the Issuer may treat the denied transaction as a very detailed pre-approval request, similar to step 420 of FIG. 4, and may place a hold on funds pending completion of the approved transaction.

Additionally at step 554, the Issuer may analyze the financial transaction information, select the type of special verification indicia most appropriate for the transaction based on the advantages and disadvantages of each for the specific financial transaction, and transmit the selected type of special verification indicia to the Purchaser.

These special verification indicia also have may be used with the processes of FIGS. 2-4. For example, the one-time full set of card information is convenient for the pre-approval process of FIG. 4, because the financial transaction with the Merchant has not been started yet, and the Merchant does not have to terminate a transaction and start a new transaction.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for pre-approving a financial transaction, wherein an issuer computer performs steps comprising:
    a) receiving a request for pre-approval of a financial transaction from a purchaser, prior to initiation of the financial transaction, wherein the request includes card information and at least one restriction;
    b) determining whether the card information is authentic and sufficient funds are available;
    c) upon determining that the card information is authentic and sufficient funds are available, transmitting a first verification indicia to a target address associated with the purchaser;
    d) subsequently, receiving financial transaction information and a second verification indicia from a merchant involved in the financial transaction;
    e) determining whether the second verification indicia is authentic based upon whether at least a portion of the second verification indicia matches at least a portion of the first verification indicia;
    f) determining whether the at least one restriction is satisfied by the received financial transaction information; and
    g) transmitting approval of the financial transaction to the merchant in response to successful authentication of the second verification indicia and the satisfaction of the at least one restriction.

2. The method of claim 1, wherein transmitting the first verification indicia to the target address associated with the purchaser comprises transmitting a first text message to a mobile phone associated with the purchaser.

3. The method of claim 1, wherein the at least one restriction is selected from a group consisting of: an amount, a merchant, a geographic location, and a time period.

4. The method of claim 1, wherein the first verification indicia comprises at least one of the following: a one-time four digit PIN, a one-time three digit verification number, a one-time five digit number, or a one-time full set of card information.

5. A method for authenticating a financial transaction, wherein an issuer computer performs steps comprising:
    a) receiving card information and financial transaction information from a merchant;
    b) determining whether the card information is authentic and sufficient funds are available for the financial transaction;
    c) determining whether conditions associated with the card information trigger a required second authentication;
    d) responsive to determining the card information is authentic, sufficient funds are available and the conditions trigger a second authentication, transmitting a first verification indicia to a target address of a purchaser associated with the card information, and transmitting a false denial to the merchant;
    e) receiving a second verification indicia from the merchant, responsive to the false denial, wherein the second verification indicia was submitted from the purchaser to the merchant in response to the first verification indicia;
    f) determining whether the second verification indicia is authentic; and
    g) transmitting approval of the financial transaction to the merchant in response to successful authentication of the second verification indicia.

6. The method of claim 5, wherein:
    the first verification indicia comprises at least one of the following: a one-time four digit PIN, a one-time three digit verification number, a one-time five digit number, or a one-time full set of card information;
    the false denial to a merchant comprises a code or a communication indicating that at least a portion of the card information is not correct;
    receiving the second verification indicia from the merchant comprises receiving at least one of the following: the one-time four digit PIN, the one-time three digit verification number, the one-time five digit number, or the one-time full set of card information; and
    authenticating the second verification indicia comprises matching the one-time four digit PIN, the one-time three digit verification number, the one-time five digit number, or the one-time full set of card information from the first verification indicia against the one-time four digit PIN, the one-time three digit verification number, the one-time five digit number, or the one-time full set of card information from the second verification indicia.

7. A method for authenticating a financial transaction, wherein a merchant point-of-sale terminal performs steps comprising:
    a) receiving card information at the terminal from a purchaser, and generating transaction information regarding the financial transaction;
    b) transmitting the card information and the transaction information to an issuer in a first transaction message to the issuer;
    c) receiving a false denial from the issuer;
    d) after the purchaser receives a first verification indicia directly from the issuer in response to the transmitted card information and transaction information, receiving a second verification indicia from the purchaser;

e) transmitting the second verification indicia to the issuer in a second transaction message to the issuer, responsive to the false denial from the issuer;

f) receiving approval from the issuer in response to the issuer successfully authenticating the second verification indicia against the first verification indicia; and g) completing the financial transaction in response to receipt of said approval.

8. A method for authenticating a financial transaction, wherein an issuer computer performs steps comprising:

a) receiving card information and financial transaction information from a merchant;

b) determining whether the card information is authentic and sufficient funds are available with respect to an account identified by the card information;

c) determining from the financial transaction information, whether or not the financial transaction can be approved without requiring a second authentication;

d) upon determining the card information is authentic and sufficient funds are available and determining that the financial transaction can not be approved without requiring a second authentication, using a target address associated with the card information to transmit a first verification indicia through a mobile network to a mobile phone;

e) receiving a second verification indicia via the merchant, following delivery of the first verification indicia to the mobile phone, indicating delivery of the second verification indicia to the merchant from the mobile phone or from a user of the mobile phone;

f) determining whether the second verification indicia is authentic; and g) transmitting approval of the financial transaction to the merchant in response to successful authentication of the second verification indicia.

9. The method of claim 8, wherein the step (c) is responsive to at least one parameter of the transaction from the group consisting of: a transaction amount, a merchant identity, a geographic location, and a period of time.

10. The method of claim 8, wherein the first verification indicia comprises at least one of the following: a one-time four digit PIN, a one-time three digit verification number, a one-time five digit number, or a one-time full set of card information.

11. The method of claim 8, wherein the first verification indicia comprises a one-time four digit personal identification number.

12. The method of claim 8, wherein transmitting the first verification indicia to the target address comprises transmitting a text message to a mobile phone number associated with an authorized user of the card information.

13. The method of claim 8, wherein step (f) determines the second verification indicia is authentic upon determining that the second verification indicia received via the merchant matches the first verification indicia transmitted to the mobile phone.

* * * * *